United States Patent
Lemoff et al.

(10) Patent No.: US 7,753,656 B2
(45) Date of Patent: Jul. 13, 2010

(54) MAGNETOHYDRODYNAMIC PUMP WITH A SYSTEM FOR PROMOTING FLOW OF FLUID IN ONE DIRECTION

(75) Inventors: Asuncion V. Lemoff, Union City, CA (US); Abraham P. Lee, Irvine, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1595 days.

(21) Appl. No.: 10/176,942

(22) Filed: Jun. 20, 2002

(65) Prior Publication Data
US 2003/0235504 A1    Dec. 25, 2003

(51) Int. Cl.
*H02K 44/00* (2006.01)
*H02K 44/08* (2006.01)

(52) U.S. Cl. .................................. 417/50; 417/322

(58) Field of Classification Search ............... 417/48, 417/50, 322, 413.2, 413.3
See application file for complete search history.

(56) References Cited

U.S. PATENT DOCUMENTS

| | | | |
|---|---|---|---|
| 4,818,185 A | | 4/1989 | Alexeff |
| 4,906,877 A | | 3/1990 | Ciaio |
| 5,011,528 A | * | 4/1991 | Mulcahy ............ 75/10.16 |
| 5,181,016 A | | 1/1993 | Lee |
| 5,375,979 A | * | 12/1994 | Trah ................ 417/52 |
| 5,560,543 A | | 10/1996 | Smith et al. |
| 5,669,433 A | | 9/1997 | Sterett et al. |
| 5,685,698 A | * | 11/1997 | Smoll ................ 417/50 |
| 5,795,457 A | | 8/1998 | Pethig et al. |
| 5,810,988 A | | 9/1998 | Smith, Jr. et al. |
| 5,876,187 A | * | 3/1999 | Forster et al. ......... 417/322 |
| 5,876,615 A | * | 3/1999 | Predetechensky ...... 222/590 |
| 5,885,470 A | * | 3/1999 | Parce et al. .......... 216/33 |
| 5,925,324 A | * | 7/1999 | Greer ............. 422/186.03 |
| 6,146,103 A | * | 11/2000 | Lee et al. ........... 417/50 |
| 6,154,226 A | | 11/2000 | York et al. |
| 6,183,206 B1 | * | 2/2001 | Valenzuela et al. ...... 417/50 |
| 6,770,183 B1 | * | 8/2004 | Hencken et al. ........ 204/600 |

FOREIGN PATENT DOCUMENTS

WO    WO 96/15576    5/1996

(Continued)

OTHER PUBLICATIONS

Jy-Hung et al., A Thermal Bubble Actauted Nozzle-Diffuser Pump, IEEE, Apr. 2001, pp. 409-412.*

(Continued)

*Primary Examiner*—Devon C Kramer
(74) *Attorney, Agent, or Firm*—Eddie E. Scott; John H. Lee

(57) ABSTRACT

A magnetohydrodynamic pump for pumping a fluid. The pump includes a microfluidic channel for channeling the fluid, a MHD electrode/magnet system operatively connected to the microfluidic channel, and a system for promoting flow of the fluid in one direction in the microfluidic channel. The pump has uses in the medical and biotechnology industries for blood-cell-separation equipment, biochemical assays, chemical synthesis, genetic analysis, drug screening, an array of antigen-antibody reactions, combinatorial chemistry, drug testing, medical and biological diagnostics, and combinatorial chemistry. The pump also has uses in electrochromatography, surface micromachining, laser ablation, inkjet printers, and mechanical micromilling.

35 Claims, 1 Drawing Sheet

FOREIGN PATENT DOCUMENTS

| | | |
|---|---|---|
| WO | WO 96/42004 | 12/1996 |
| WO | WO 97/25152 | 7/1997 |
| WO | WO 98/14272 | 4/1998 |

OTHER PUBLICATIONS

Lemoff, A., et al., "An AC magnetohydrodynamic micropump," Sensors and Actuators B Chemical B 63, (2000), pp. 178-185, Elsevier Science S.A.

Lemoff, A, "Field Driven Microfluidic Actuators for Micro Total Analysis Systems: Magnetohydrodynamic Micropump and Microfluidic Switch, Electrostatic DNA Extractor, Dielectrophoretic DNA Sorter," Dissertation for Doctor of Philosophy in Engineering: Applied Science in the Office of Graduate Studies of the Univ. of California, Davis, (2000), 97 pages.

Morris, C., et al., "Optimization of a circular piezoelectric bimorph for a micropump driver," J. Micromech. Microeng. 10, (2000), pp. 459-465, IOP Publishing Ltd.

Tsai, Jr-Hung, et al., "A Thermal Bubble Actuated Micro Nozzle-Diffuser Pump," IEEE, (2001), pp. 409-412.

Stemme, E., et al., "A valveless diffuser/nozzle-based fluid pump," Sensors and Actuators A, 39, (1993), Elsevier Sequoia, pp. 159-167.

* cited by examiner

MAGNETOHYDRODYNAMIC PUMP WITH A SYSTEM FOR PROMOTING FLOW OF FLUID IN ONE DIRECTION

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to microfluidics and more particularly to a magnetohydrodynamic (MHD) pump.

2. State of Technology

Background information is contained in U.S. Pat. No. 5,876,187 for micropumps with fixed valves to Fred K. Forster et al., patented Mar. 2, 1999 including the following: "Miniature pumps, hereafter referred to as micropumps, can be constructed using fabrication techniques adapted from those applied to integrated circuits. Such fabrication techniques are often referred to as micromachining. Micropumps are in great demand for environmental, biomedical, medical, biotechnical, printing, analytical instrumentation, and miniature cooling applications. Just as in larger applications, various pump designs are required for different micropump systems. The valve components of micropumps may include passive polysilicon check valves, gas-controlled valves with silicon membranes, solenoid-actuated valves with nickel diaphragms, and magnetically or electrostatically driven control valves. Valves that include components that are actuated or otherwise driven can be characterized as active valves. Manufacture and operation of active valves can add substantial complexity and cost to the production of micropumps. Passive-type valves, such as those having movable polysilicon check valves, can be manufactured with reduced complexity, although these valves can fail when the pumped fluid includes particulates. In this regard, the particulate sizes are of the same order of magnitude as the passages in the micropumps. The passive valves become obstructed by particulates and are, therefore, unable to provide a sufficient seal when required. As a result, such valves have limited effectiveness when employed for pumping fluids that include particulates. Similarly, active valves that employ substantially rigid sealing membranes or diaphragms are susceptible to seal failure when used to pump fluids containing particulates. The particulates become embedded in the sealing surface as a result of the relatively high pressure applied to the rigid diaphragm as needed to ensure a seal with such a valve. Once the particulates become embedded in the sealing surface, the valve is thereafter prevented from fully closing. Fixed valves are valves having no moving parts. Fixed valves represent the utmost simplicity and high reliability for pumping fluids. Such valves, which do not include parts that periodically seal and move apart, are especially advantageous for micropump systems used for pumping fluids that include particulates. Moreover, fixed-valve pumps are particularly useful for biological applications that require pumping fluids that contain cells. The cells are not damaged by the fixed valve pumps, as would otherwise occur in moving-parts valves. The effectiveness of fixed valves can be characterized by the parameter "diodicity," which is the ratio of pressure drop in the reverse-direction fluid flow through the valve to the pressure drop in the forward-direction fluid flow through the valve, for a given flow rate. A basic design consideration for a fixed valve micropump is to develop valve configurations that result in a diodicity greater than 1.0. In this regard, the small size of such valves, and the very low flow range (100 nl/min to 50 ml/min, for example) will typically yield a relatively low Reynolds number, which number is a dimensionless parameter that is proportional to the product of the valve size and flow velocity. Accordingly, the valve configurations must effect the requisite diodicity in flows characterized by low Reynolds numbers, where flow separation and turbulence (with attendant significant pressure losses) are unlikely to occur. U.S. Pat. No. 1,329,559 discloses a fixed valve that is designated as a "valvular conduit." The conduit is provided with enlargements, recesses, and projections that are said to offer virtually no resistance to the passage of fluids in one direction, yet provide a nearly impassible barrier to fluid flow in the opposite direction. When an oscillating flow of fluid is applied to one end of the conduit, the conduit acts as a one-way valve or fluidic diode, thereby permitting the oscillated or pulsed fluid to be pumped through the conduit. The conduit is mounted to a piston that is rapidly reciprocated to provide the pulsed flow of fluid through the conduit. The valvular conduit described in U.S. Pat. No. 1,329,559 is full-sized, constructed of metal, and used for delivering fluids with flows that can most likely be characterized as having a relatively high Reynolds number. No insight is provided in that patent as to how such a conduit could be adapted to a micropump system and flows characterized by low Reynolds numbers."

Background information is contained in U.S. Pat. No. 6,146,103 for micromachined magnetohydrodynamic actuators and sensors to Abraham P. Lee and Asuncion V. Lemoff, patented Nov. 14, 2000 including the following: "Microfluidics is the field for manipulating fluid samples and reagents in minute quantities, such as in micromachined channels, to enable hand-held bioinstrumentation and diagnostic tools with quicker process speeds. The ultimate goal is to integrate pumping, valving, mixing, reaction, and detection on a chip for biotechnological, chemical, environmental, and health care applications. Most micropumps developed thus far have been complicated, both in fabrication and design, and often are difficult to reduce in size, negating many integrated fluidic applications. Most pumps have a moving component to indirectly pump the fluid, generating pulsatile flow instead of continuous flow. With moving parts involved, dead volume is often a serious problem, causing cross-contamination in biological sensitive processes. The present invention utilizes MHDs for microfluid propulsion and fluid sensing, the microfabrication methods for such a pump, and the integration of multiple pumps for a microfluidic system. MHDs is the application of Lorentz force law on fluids to propel or pump fluids. Under the Lorentz force law, charged particles moving in a uniform magnetic field feel a force perpendicular to both the motion and the magnetic field. It has thus been recognized that in the microscale, the MHD forces are substantial for propulsion of fluids through microchannels as actuators, such as a micropump, micromixer, or microvalve, or as sensors, such as a microflow meter, or viscosity meter. This advantageous scaling phenomenon also lends itself to micromachining by integrating microchannels with micro-electrodes." The disclosure of U.S. Pat. No. 6,146,103 is incorporated herein by reference.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a magnetohydrodynamic pump for pumping a fluid. The system includes a microfluidic channel for channeling the fluid, a MHD electrode/magnet system operatively connected to the microfluidic channel, and a system for promoting flow of the fluid in one direction in the microfluidic channel. The MHD electrode/magnet system includes a pair of electrodes and a magnet. The system for promoting flow of the fluid in one direction in the microfluidic channel comprises a system that promotes fluid flow in one direction and inhibits fluid flow in the opposite direction. The magnetohydrodynamic pump has uses in the medical and biotechnology industries as well as other industries. Some examples of uses for the magnetohydrodynamic pump include use for blood-cell-separation equipment, biochemical assays, chemical synthesis, genetic analysis, drug screening, an array of antigen-antibody reactions, combinatorial chemistry, drug testing, medical and biological diagnostics, and combinatorial chemistry. The pump also has uses in electrochromatography, surface micromachining, laser ablation, inkjet printers, and mechanical micromilling.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
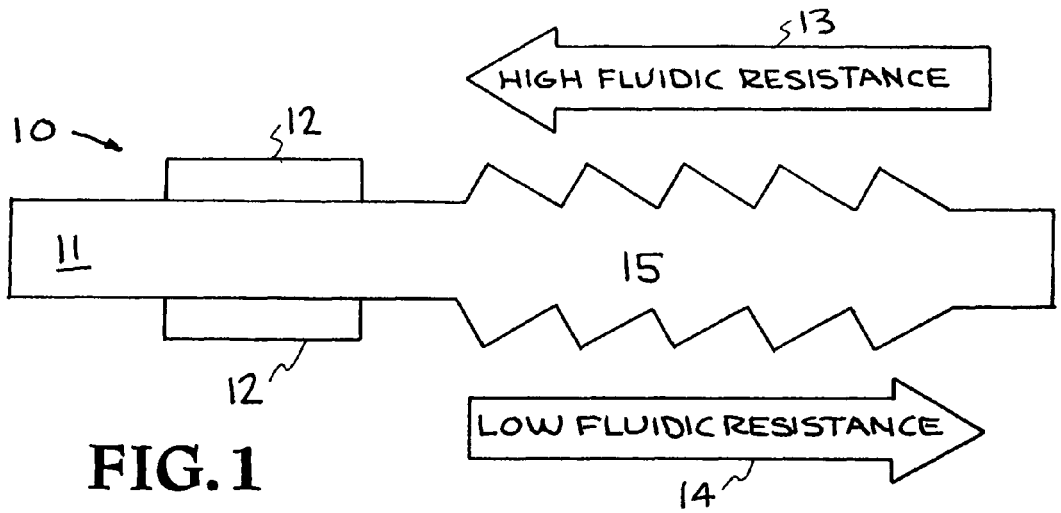
FIG. 1 is an illustration of an AC-DC MHD pump system having high fluidic resistance in one direction and low fluidic resistance in the opposite direction.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to FIG. 1 a top view of AC-DC MHD microchannel and pump configuration is illustrated schematically. The MHD pump system is designated generally by the reference numeral 10. The system 10 represents one embodiment of the present invention that provides microscale pumping of fluids accomplished through microfluidics. Magnetohydrodynamics (or MHD) is the theory of the macroscopic interaction of electrically conducting fluids with a magnetic field. Magnetohydrodynamics applies the Lorentz force law on fluids to propel or pump fluids. Under the Lorentz force law, charged particles moving in a uniform magnetic field feel a force perpendicular to both the motion and the magnetic field. In the viscous incompressible case, MHD flow is governed by the Navier-Stokes equations and the pre-Maxwell equations of the magnetic field. The latter will in general transcend the region of conducting fluid and, ideally, extend to all of space. It is mostly this feature, the electromagnetic interaction of the fluid with the outside world, which gives rise to challenging problems of mathematical analysis and numerical approximation.

The pumping mechanism for the MHD pump results from the Lorentz force. This force is produced when an electric current is applied across a channel filled with conducting solution in the presence of a perpendicular magnetic field. The Lorentz force is both perpendicular to the current in the channel and the magnetic field, and is given by the equation:

$$F = I \times Bw$$

where I is electric current across the channel (measured in amperes), B is the magnetic field (measured in Tesla) and w is the distance between the electrodes.

Micropumps are a critical component in any microfluidic system. Fluids need to be transported from one point to another. To have a truly integrated microfluidic system, external micropumps can not be used. The present invention provides a pump using the magnetohydrodynamic force and combines AC and DC forces for its actuation.

As illustrated in FIG. 1, a MHD electrode pair and DC magnet system 12 is provided in a microchannel 11. The magnetic field of the DC magnet is perpendicular to the electrodes. A system 15 is provided in the microchannel to promote flow in one direction. The system 15 promotes flow in one direction and inhibits flow in the opposite direction. As illustrated in FIG. 1, the system 15 has a lower fluidic resistance 14 in one direction allowing for higher flow rates and a higher fluidic resistance 13, which can minimize the no flow rate in the opposite direction. When flow is in the high-fluidic resistance direction 13, the fluid particles are reflected back to prevent flow. Examples of systems to promote flow in one direction are described in U.S. Pat. No. 5,876,187 for micropumps with fixed valves to Fred K. Forster et al., patented Mar. 2, 1999.

The system 10 provides an AC MHD micropump using the Lorentz force produced by applying an AC current to a pair of electrodes across a microchannel in the presence of an magnetic field. The magnetohydrodynamic force is actuated using an AC current in the microchannel and a DC permanent magnet perpendicular to the current in the channel. For a linear microchannel, this AC current and DC magnet configuration would, without the system 15, results with no net flow, since the positive cycle of the AC current in the channel results in a flow in one direction and the negative cycle results in a flow in the opposite direction. The system 15 has been designed such that flow in one direction can occur while the flow in the opposite direction can be minimized. This is done by designing a system 15 that has a lower fluidic resistance in one direction and higher fluidic resistance in the opposite direction. With system 15 the AC current in the channel and DC magnet configuration provides a net flow in one direction.

Using a DC magnet allows for lower power consumption in the AC-DC MHD micropump.

The system 10 has uses in many fields particularly the medical and biotechnology industries. The uses include blood-cell-separation equipment, biochemical assays, chemical synthesis, genetic analysis, drug screening, electrochromatography, surface micromachining, laser ablation, inkjet printers, and mechanical micromilling. The present invention can be used for an array of antigen-antibody reactions, combinatorial chemistry, drug testing, medical and biological diagnostics, and combinatorial chemistry.

Figure 2:
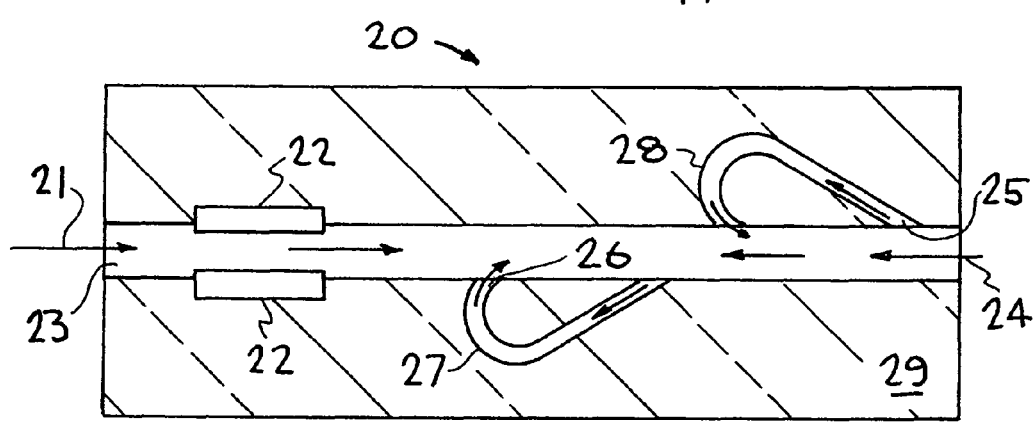
FIG. 2 illustrates an AC-DC MHD pump system with microfluidic channel loops connected to a microfluidic channel for at least partially reversing fluid flow in one direction.

Referring now to FIG. 2 a top view of AC-DC MHD microchannel and pump configuration representing another embodiment of the present invention is shown. Micropumps are a critical component in any microfluidic system. Fluids need to be transported from one point to another. To have a truly integrated microfluidic system, external micropumps can not be used. The present invention provides a pump using the magnetohydrodynamic force and combines AC and DC forces for its actuation. FIG. 2 is top view of a microfluidic channel 23 fabricated on a plastic, glass or silicon base 29. The MHD pump system is designated generally by the reference numeral 20. The system 20 provides microscale pumping of fluids accomplished through microfluidics. Magnetohydrodynamics (or MHD) is the theory of the macroscopic interaction of electrically conducting fluids with a magnetic field. Magnetohydrodynamics applies the Lorentz force law on fluids to propel or pump fluids. Under the Lorentz force law, charged particles moving in a uniform magnetic field feel a force perpendicular to both the motion and the magnetic field. In the viscous incompressible case, MHD flow is governed by the Navier-Stokes equations and the pre-Maxwell equations of the magnetic field. The latter will in general transcend the region of conducting fluid and, ideally, extend to all of space. It is mostly this feature, the electromagnetic interaction of the fluid with the outside world, which gives rise to challenging problems of mathematical analysis and numerical approximation.

The pumping mechanism for the MHD pump results from the Lorentz force. This force is produced when an electric current is applied across a channel filled with conducting solution in the presence of a perpendicular magnetic field. The Lorentz force is both perpendicular to the current in the channel and the magnetic field, and is given by the equation:

$$F = I \times Bw$$

where I is electric current across the channel (measured in amperes), B is the magnetic field (measured in Tesla) and w is the distance between the electrodes.

As illustrated in FIG. 2, a MHD electrode/magnet system 22 is provided in the microchannel 23. The MHD electrode/magnet system 22 includes a MHD electrode pair and a DC magnet system. Metal electrodes are patterned on the substrate and the DC magnet is located underneath the microchannel encompassing the MHD electrode pair. The magnetic field of the DC magnet is perpendicular to the electrodes. The system 20 provides an AC MHD micropump using the Lorentz force produced by applying an AC current to a pair of electrodes across a microchannel in the presence of an magnetic field. The magnetohydrodynamic force is actuated using an AC current in the microchannel and a DC permanent magnet perpendicular to the current in the channel. For a linear microchannel, this AC current and DC magnet configuration would, without additional components, results with no net flow, since the positive cycle of the AC current in the channel results in a flow in one direction and the negative cycle results in a flow in the opposite direction.

A system is provided in the microchannel to promote flow in one direction as illustrated by the arrows 21. The system promotes flow in the one direction 21 and inhibits flow in the opposite direction. With the AC current and DC magnet the positive cycle of the AC current in the channel 23 results in a flow in one direction 21 and the negative cycle results in a flow in the opposite direction as illustrated by the arrows 24. Loop channels 27 and 28 are provided in base 29 to redirect the flow 24 and align it with the flow 21. The microchannels are designed such that flow in one direction is preferred because the flow in the opposite direction is hindered by other channels. The reverse flow direction has a higher fluidic resistance since it sees more channels for fluid to flow in, thus the net flow is going from left to right providing the flow in one direction 21. When flow is in the high-fluidic resistance direction 21, the fluid particles are reflected back to inhibit flow in the opposite direction 24. Additional examples of systems to promote flow in one direction are described in U.S. Pat. No. 5,876,187 for micropumps with fixed valves to Fred K. Forster et al., patented Mar. 2, 1999.

The system 20 has been designed such that flow in one direction can occur while the flow in the opposite direction can be minimized. This is done by designing the system 20 that has a lower fluidic resistance in one direction and higher fluidic resistance in the opposite direction. With system 20 the AC current in the channel and DC magnet configuration provides a net flow in one direction. Using a DC magnet allows for lower power consumption in the AC-DC MHD micropump.

The system 20 has uses in many fields particularly the medical and biotechnology industries. The uses include blood-cell-separation equipment, biochemical assays, chemical synthesis, genetic analysis, drug screening, electrochromatography, surface micromachining, laser ablation, inkjet printers, and mechanical micromilling. The system 20 can be used for an array of antigen-antibody reactions, combinatorial chemistry, drug testing, medical and biological diagnostics, and combinatorial chemistry.

Figure 3:
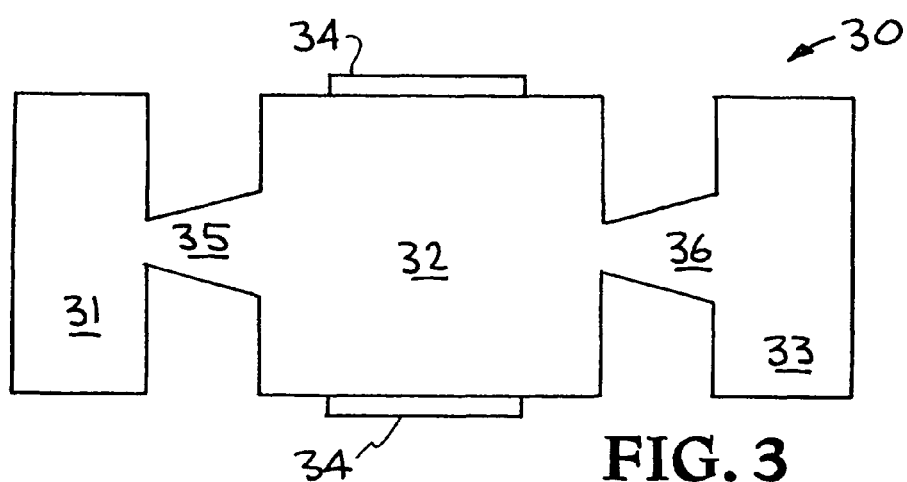
FIG. 3 is an illustration of a MHD DC-AC micropump nozzle-diffuser system constructed in accordance with the present invention.

Referring now to FIG. 3, a system incorporating a MHD DC-AC micropump nozzle-diffuser system constructed in accordance with the present invention is illustrated. The MHD DC-AC micropump nozzle-diffuser system is designated generally by the reference numeral 30. The system 30 provides a MHD DC-AC micropump nozzle-diffuser system for pumping a fluid. It includes an inlet, a MHD chamber, an outlet, a MHD electrode/magnet system operatively connected to the MHD chamber, and a nozzle-diffuser system operatively connected to the inlet, the MHD chamber, and the outlet for promoting flow of the fluid in one direction. In one embodiment the MHD electrode/magnet system includes a AC source connected to a pair of electrodes and a DC magnet. In one embodiment the nozzle-diffuser system promotes flow in one direction and inhibits fluid flow in the opposite direction. In one embodiment the nozzle-diffuser system act as a pressure dropper. In one embodiment the nozzle-diffuser system includes a first nozzle-diffuser for promoting flow of the fluid in one direction connecting the MHD chamber with the inlet and a second nozzle-diffuser for promoting flow of the fluid in one direction connecting the MHD chamber with the outlet. The system 30 includes an inlet reservoir 31, a MHD chamber 32, an outlet reservoir 33, a MHD electrode pair and magnet system 34, a nozzle-diffuser 35 and microfluidic channel connecting the MHD chamber 32 with the inlet reservoir 31, and a nozzle-diffuser 36 and microfluidic channel connecting the MHD chamber 32 with the outlet reservoir 33.

As the MHD chamber 32 pumps towards the right, maximum flow is pulled from the inlet reservoir 31 to the MHD chamber 32 and exits to the outlet reservoir 33. As it pumps towards the left, both actions are minimized.

The system 30 enables the manipulation of fluid samples and reagents in minute quantities in micromachined channels to enable hand-held bioinstrumentation and diagnostic tools with quicker process speeds. The system 30 has uses in the medical, pharmaceutical, chemical, biological diagnostics, environmental testing, food testing, water testing, and other fields. The system 30 can be used for an array of antigen-antibody reactions, combinatorial chemistry, drug testing, medical and biological diagnostics, and combinatorial chemistry. Other uses of system 30 include inkjet printers, blood-cell-separation equipment, biochemical assays, chemical synthesis, genetic analysis, drug screening, electrochromatography, surface micromachining, laser ablation, and mechanical micromilling. The system 30 is easy to manufacture and integrate.

One embodiment of the MHD DC-AC micropump nozzle-diffuser system 30 for pumping a fluid includes a base, a microfluidic channel in the base for channeling the fluid, an inlet in the microfluidic channel, an outlet in the microfluidic channel, a MHD chamber in the microfluidic channel, a MHD electrode/magnet system operatively connected to the MHD chamber, and a nozzle-diffuser system operatively connected to the inlet, the MHD chamber, and the outlet for promoting flow of the fluid in one direction. In one embodiment the base is composed of silicon. In one embodiment the base is composed of plastic. In one embodiment the base is composed of glass. In one embodiment the base is composed of silicon, plastic, and/or glass. In one embodiment the MHD electrode/magnet system comprises a pair of metal electrodes patterned on the base. In one embodiment the MHD electrode/magnet system includes a DC magnet. In one embodiment the MHD electrode/magnet system includes a permanent magnet. The nozzle-diffuser system promotes flow in one direction and inhibits fluid flow in the opposite direction. The nozzle-diffuser system acts as a pressure dropper. The nozzle-diffuser system includes a first nozzle-diffuser for promoting flow of the fluid in one direction connecting the MHD chamber with the inlet and a second nozzle-diffuser for promoting flow of the fluid in one direction connecting the MHD chamber with the outlet.

Having described the overall system 30, individual components of the system 30 will now be described in greater detail. The MHD electrode pair and magnet system 34 utilize a MHD micropump system in which the Lorentz force is used to propel an electrolytic solution along a microchannel. The pumping mechanism for a MHD pump results from the Lorentz force. This force is produced when an electric current is applied across a channel filled with conducting solution in the presence of a perpendicular magnetic field. The Lorentz force is both perpendicular to the current in the channel and the magnetic field, and is given by the equation:

$$F = I \times Bw$$

where I is electric current across the channel (measured in amperes), B is the magnetic field (measured in Tesla) and w is the distance between the electrodes. In the microscale, the MHD forces are substantial and can be used for propulsion of fluids through microchannels. The MHD forces can be used as actuators, such as a micropump, micromixer, or microvalve, or as sensors, such as a microflow meter, or viscosity meter. This advantageous scaling phenomenon also lends itself to micromachining by integrating microchannels with micro-electrodes.

The nozzle-diffuser 35 connects the MHD chamber 32 with the inlet reservoir 31. The nozzle-diffuser 36 connects the MHD chamber 32 with the outlet reservoir 33. In the nozzle-diffusers 35 and 36, the nozzle acts as a flow constrictor while the diffuser acts as a pressure dropper. When pumping towards the right, both sides are acting in a diffuser mode where pressure is dropped and flow rate is maximized. When the MHD pumps towards the left, both sides become nozzles, and pressure builds up with not much flow increase. The action of the MHD DC-AC micropump nozzle-diffuser system can be analogized to the action of the transmission of a car. At low gear (nozzle) higher torque is generated while speed is low. At high gear (diffuser), torque is low but inertial force, or the speed, is high. Essentially, with the same power output from the MHD, pressure flow rate is constant. The nozzle generates higher pressure and the diffuser generates higher flow rate. The pump exploits this characteristic in a directional fashion.

The system 30 provides a method of producing a MHD DC-AC micropump nozzle-diffuser system for pumping a fluid, including the steps of: providing a base, providing a microfluidic channel in the base for channeling the fluid, providing an inlet in the microfluidic channel, providing an outlet in the microfluidic channel, providing a MHD chamber in the microfluidic channel, providing a MHD electrode/magnet system operatively connected to the MHD chamber, and providing a nozzle-diffuser system operatively connected to the inlet, the MHD chamber, and the outlet for promoting flow of the fluid in one direction. The nozzle-diffuser system promotes flow in one direction and inhibits fluid flow in the opposite direction. The nozzle-diffuser system act as a pressure dropper. In one embodiment the nozzle-diffuser system includes a first nozzle-diffuser for promoting flow of the fluid in one direction connecting the MHD chamber with the inlet and a second nozzle-diffuser for promoting flow of the fluid in one direction connecting the MHD chamber with the outlet.

The system 30 has uses in many fields particularly the medical and biotechnology industries. The uses include blood-cell-separation equipment, biochemical assays, chemical synthesis, genetic analysis, drug screening, electrochromatography, surface micromachining, laser ablation, inkjet printers, and mechanical micromilling. The present invention can be used for an array of antigen-antibody reactions, combinatorial chemistry, drug testing, medical and biological diagnostics, and combinatorial chemistry.

Various embodiments of the present invention have been illustrated that provide a magnetohydrodynamic pumping system for pumping a fluid. One embodiment of the magnetohydrodynamic pumping system includes a base, a microfluidic channel in the base for channeling the fluid, an AC MHD electrode pair operatively connected to the microfluidic channel, a magnet operatively connected to the microfluidic channel, and a system for promoting flow of the fluid in one direction in the microfluidic channel. The base is may be composed of silicon or the base may be composed of plastic or the base may be composed of glass or the base may be composed of other materials. The base may be composed of various combinations of silicon, plastic, and/or glass. The AC MHD electrode pair comprises a pair of metal electrodes patterned on the base. In one embodiment the magnet is a DC magnet. In one embodiment the magnet is a permanent magnet. The system for promoting flow of the fluid in one direction in the microfluidic channel promotes flow in one direction and inhibits fluid flow in the opposite direction. In one embodiment the system for promoting flow of the fluid in one direction in the microfluidic channel includes a microfluidic channel loop connected to the microfluidic channel for at least partially reversing flow of the fluid in the one direction. The system for promoting flow of the fluid in one direction in the microfluidic channel includes systems for at least partially reversing flow of the fluid in the one direction. In one embodiment the system for at least partially reversing flow of the fluid in the one direction includes means for reversing flow direction by providing a higher fluidic resistance because there are more channels for fluid to flow in resulting in net flow in the one direction. In one embodiment the system for promoting flow of the fluid in one direction in the microfluidic channel includes at least one microfluidic loop channel connected to the microfluidic channel. One embodiment of the magnetohydrodynamic pumping system includes a base, a microfluidic channel in the base for channeling the fluid, an inlet in the microfluidic channel, an outlet in the microfluidic channel, a MHD chamber in the microfluidic channel, a MHD electrode/magnet system operatively connected to the MHD chamber, and a nozzle-diffuser system operatively connected to the inlet, the MHD chamber, and the outlet for promoting flow of the fluid in one direction.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An integrated microfluidic system that provides a magnetohydrodynamic pump for pumping a fluid, consisting of:
    a microfluidic channel for channeling said fluid, said microfluidic channel formed in a base,
    a magnetohydrodynamic electrode and magnet system operatively connected to said microfluidic channel, and
    a nonmagnetic system in said microfluidic channel in said base for promoting flow of said fluid in one direction in said microfluidic channel, said nonmagnetic system being in addition to said magnetohydrodynamic electrode and magnet system.

2. The integrated microfluidic system that provides a magnetohydrodynamic pump of claim 1, wherein said magnetohydrodynamic electrode and magnet system includes a AC source connected to a pair of electrodes and a DC magnet.

3. The integrated microfluidic system that provides a magnetohydrodynamic pump of claim 1, wherein said nonmagnetic system for promoting flow of said fluid in one direction in said microfluidic channel promotes flow in one direction and inhibits fluid flow in the opposite direction.

4. The integrated microfluidic system that provides a magnetohydrodynamic pump of claim 1, wherein said nonmagnetic system for promoting flow of said fluid in one direction in said microfluidic channel includes a microfluidic channel loop connected to said microfluidic channel for at least partially reversing flow of said fluid in said one direction.

5. The integrated microfluidic system that provides a magnetohydrodynamic pump of claim 1, wherein said nonmagnetic system for promoting flow of said fluid in one direction in said microfluidic channel includes system for at least partially reversing flow of said fluid in said one direction.

6. The integrated microfluidic system that provides a magnetohydrodynamic pump of claim 5, wherein said system for at least partially reversing flow of said fluid in said one direction includes means for reversing flow direction by providing a higher fluidic resistance because there are more channels for fluid to flow resulting in net flow in said one direction.

7. The integrated microfluidic system that provides a magnetohydrodynamic pump of claim 1, wherein said nonmagnetic system for promoting flow of said fluid in one direction in said microfluidic channel includes at least one microfluidic loop channel connected to said microfluidic channel.

8. The integrated microfluidic system that provides a magnetohydrodynamic pump of claim 1, including a magnetohydrodynamic chamber with an inlet and an outlet, wherein said nonmagnetic system for promoting flow of said fluid in one direction in said microfluidic channel includes a nozzle-diffuser system operatively connected to said inlet, said magnetohydrodynamic chamber, and said outlet for promoting flow of said fluid in one direction.

9. The integrated microfluidic system that provides a magnetohydrodynamic pump of claim 8, wherein said nozzle-diffuser system acts as a pressure dropper.

10. The integrated microfluidic system that provides a magnetohydrodynamic pump of claim 8, wherein said nozzle-diffuser system includes a first nozzle-diffuser for promoting flow of said fluid in one direction connecting said magnetohydrodynamic chamber with said inlet and a second nozzle-diffuser for promoting flow of said fluid in one direction connecting said magnetohydrodynamic chamber with said outlet.

11. An integrated microfluidic system that provides a magnetohydrodynamic pump for pumping a fluid, consisting of:
    a base,
    a microfluidic channel in said base for channeling said fluid,
    an AC magnetohydrodynamic electrode pair operatively connected to said microfluidic channel,
    a magnet operatively connected to said microfluidic channel, and
    a nonmagnetic system in said microfluidic channel in said base for promoting flow of said fluid in one direction in said microfluidic channel, said nonmagnetic system being in addition to said AC magnetohydrodynamic electrode pair and said magnet.

12. The integrated microfluidic system that provides a magnetohydrodynamic pump of claim 11, wherein said base is composed of silicon.

13. The integrated microfluidic system that provides a magnetohydrodynamic pump of claim 11, wherein said base is composed of plastic.

14. The integrated microfluidic system that provides a magnetohydrodynamic pump of claim 11, wherein said base is composed of glass.

15. The integrated microfluidic system that provides a magnetohydrodynamic pump of claim 11, wherein said base is composed of silicon, plastic, or glass.

16. The integrated microfluidic system that provides a magnetohydrodynamic pump of claim 11, wherein said AC magnetohydrodynamic electrode pair comprises a pair of metal electrodes patterned on said base.

17. The integrated microfluidic system that provides a magnetohydrodynamic pump of claim 11, wherein said magnet is a DC magnet.

18. The integrated microfluidic system that provides a magnetohydrodynamic pump of claim 11, wherein said magnet is a permanent magnet.

19. The integrated microfluidic system that provides a magnetohydrodynamic pump of claim 11, wherein said nonmagnetic system for promoting flow of said fluid in one direction in said microfluidic channel promotes flow in one direction and inhibits fluid flow in the opposite direction.

20. The integrated microfluidic system that provides a magnetohydrodynamic pump of claim 11, wherein said nonmagnetic system for promoting flow of said fluid in one direction in said microfluidic channel includes a microfluidic channel loop connected to said microfluidic channel for at least partially reversing flow of said fluid in said one direction.

21. The integrated microfluidic system that provides a magnetohydrodynamic pump of claim 11, wherein said nonmagnetic system for promoting flow of said fluid in one direction in said microfluidic channel includes system for at least partially reversing flow of said fluid in said one direction.

22. The integrated microfluidic system that provides a magnetohydrodynamic pump of claim 21, wherein said system for at least partially reversing flow of said fluid in said one direction includes means for reversing flow direction by providing a higher fluidic resistance because there are more channels for fluid to flow resulting in net flow in said one direction.

23. The integrated microfluidic system that provides a magnetohydrodynamic pump of claim 11, wherein said nonmagnetic system for promoting flow of said fluid in one direction in said microfluidic channel includes at least one microfluidic loop channel connected to said microfluidic channel.

24. The integrated microfluidic system that provides a magnetohydrodynamic pump of claim 11, including a magnetohydrodynamic chamber with an inlet and an outlet, wherein said nonmagnetic system for promoting flow of said fluid in one direction in said microfluidic channel includes a nozzle-diffuser system operatively connected to said inlet, said magnetohydrodynamic chamber, and said outlet for promoting flow of said fluid in one direction.

25. The integrated microfluidic system that provides a magnetohydrodynamic pump of claim 24, wherein said nozzle-diffuser system promotes flow in one direction and inhibits fluid flow in the opposite direction.

26. The integrated microfluidic system that provides a magnetohydrodynamic pump of claim 25, wherein said nozzle-diffuser system act as a pressure dropper.

27. The integrated microfluidic system that provides a magnetohydrodynamic pump of claim 26, wherein said nozzle-diffuser system includes a first nozzle-diffuser for promoting flow of said fluid in one direction connecting said magnetohydrodynamic chamber with said inlet and a second nozzle-diffuser for promoting flow of said fluid in one direction connecting said magnetohydrodynamic chamber with said outlet.

28. A method of producing an integrated microfluidic system that provides a magnetohydrodynamic pump for pumping a fluid, consisting of the steps of:

providing a base,
providing a microfluidic channel in said base,
providing an AC magnetohydrodynamic electrode pair operatively connected to said microfluidic channel,
providing a magnet operatively connected to said microfluidic channel, and
providing a nonmagnetic system in said microfluidic channel in said base for promoting flow of said fluid in one direction in said microfluidic channel, said nonmagnetic system being in addition to said AC magnetohydrodynamic electrode pair and said magnet.

29. The method of producing an integrated microfluidic system that provides a magnetohydrodynamic pump for pumping a fluid of claim 28, wherein said magnet is a DC magnet.

30. The method of producing an integrated microfluidic system that provides a magnetohydrodynamic pump for pumping a fluid of claim 28, wherein said nonmagnetic system for promoting flow of said fluid in one direction in said microfluidic channel in said base promotes flow in one direction and inhibits fluid flow in the opposite direction.

31. The method of producing an integrated microfluidic system that provides a magnetohydrodynamic pump for pumping a fluid of claim 28, wherein said nonmagnetic system for promoting flow of said fluid in one direction in said microfluidic channel in said base includes at least one microfluidic loop channel connected to said microfluidic channel.

32. The method of producing a magnetohydrodynamic pump for pumping a fluid of claim 28, including a magnetohydrodynamic chamber with an inlet and an outlet, wherein said nonmagnetic system for promoting flow of said fluid in one direction in said microfluidic channel includes providing a nozzle-diffuser system operatively connected to said inlet, said magnetohydrodynamic chamber, and said outlet for promoting flow of said fluid in one direction.

33. The method of producing a magnetohydrodynamic pump for pumping a fluid of claim 32, wherein said nozzle-diffuser system promotes flow in one direction and inhibits fluid flow in the opposite direction.

34. The method of producing a magnetohydrodynamic pump for pumping a fluid of claim 33, wherein said nozzle-diffuser system act as a pressure dropper.

35. The method of producing a magnetohydrodynamic pump for pumping a fluid of claim 34, wherein said nozzle-diffuser system includes a first nozzle-diffuser for promoting flow of said fluid in one direction connecting said magnetohydrodynamic chamber with said inlet and a second nozzle-diffuser for promoting flow of said fluid in one direction connecting said magnetohydrodynamic chamber with said outlet.

* * * * *